Dec. 15, 1942.  T. F. THOMPSON  2,304,864
CLUTCH MECHANISM
Original Filed Dec. 16, 1938   2 Sheets-Sheet 1
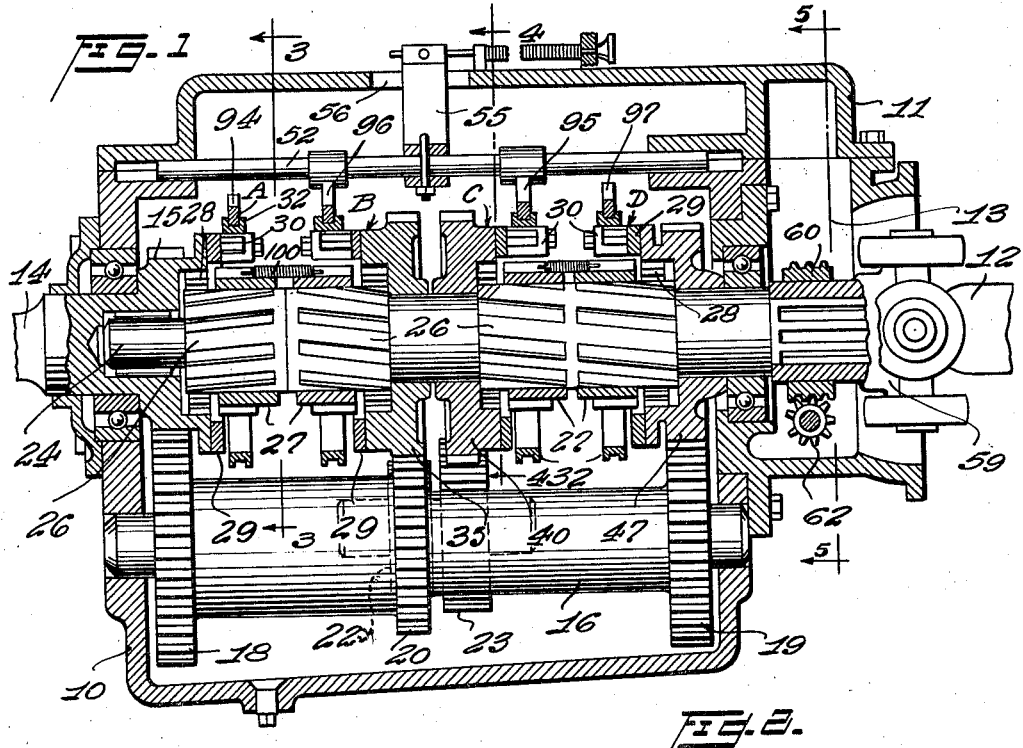
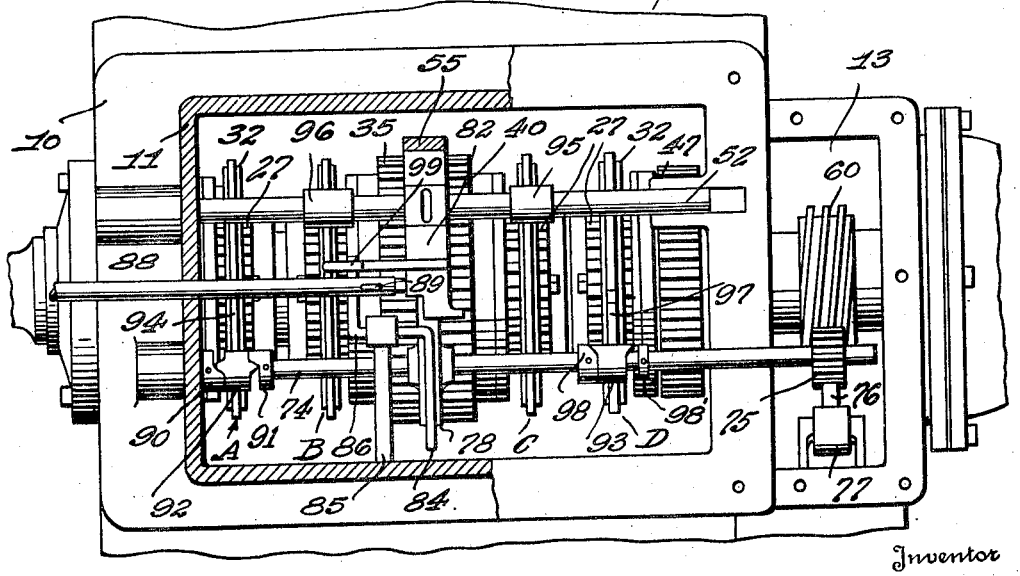
Inventor
Theodore F. Thompson
By Watson, Cole, Grindle & Watson
Attorney Dec. 15, 1942. T. F. THOMPSON 2,304,864
CLUTCH MECHANISM
Original Filed Dec. 16, 1938  2 Sheets-Sheet 2
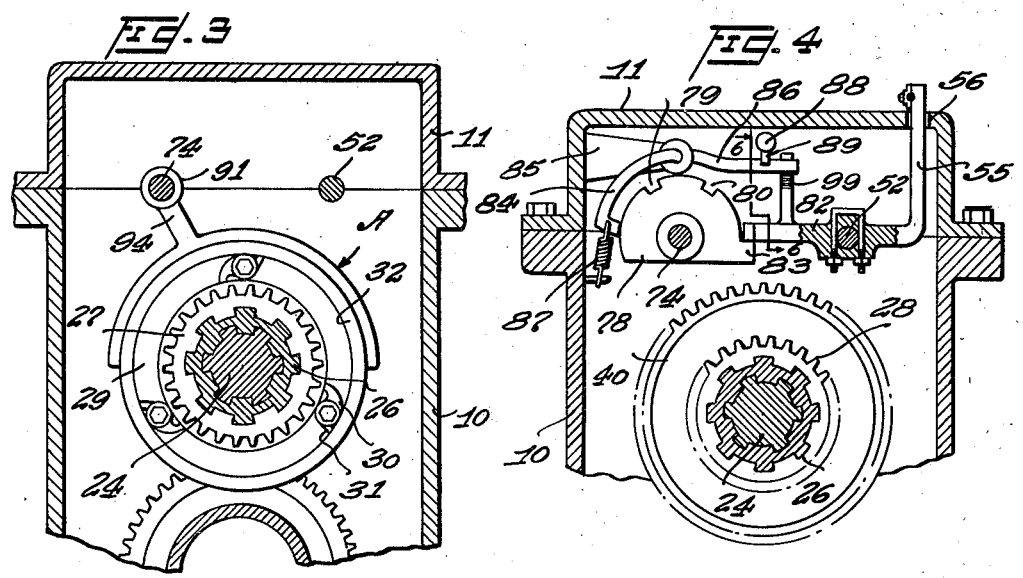
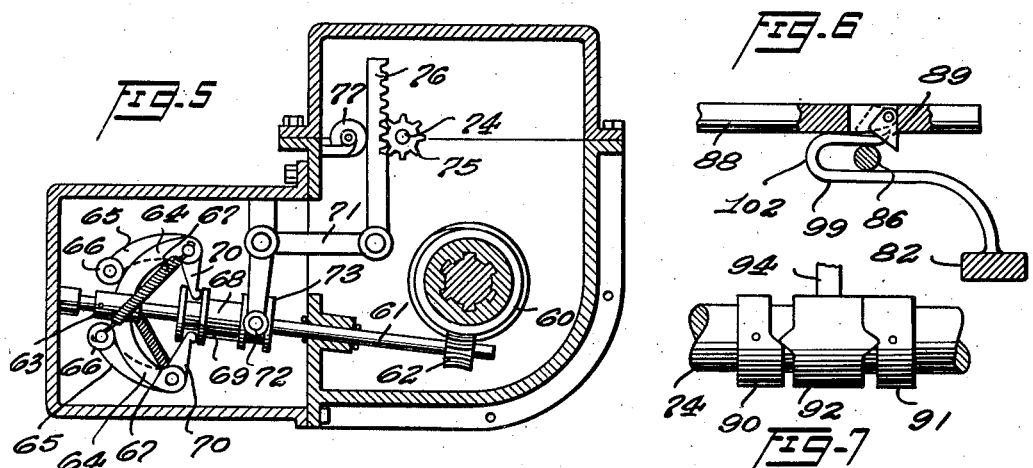
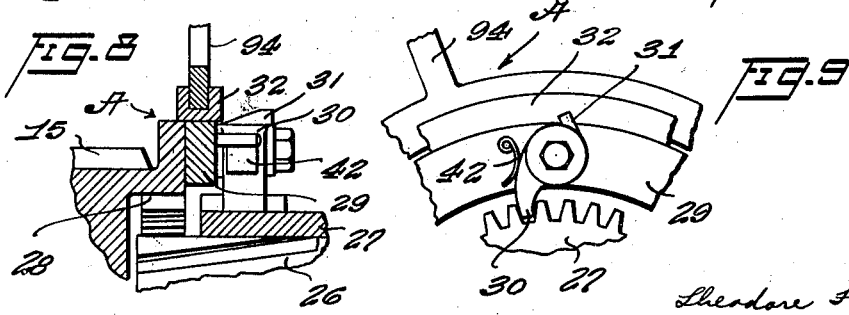
Inventor
Theodore F. Thompson
By Watson, Cole, Grindle & Watson
Attorney Patented Dec. 15, 1942

2,304,864

UNITED STATES PATENT OFFICE 2,304,864

CLUTCH MECHANISM

Theodore F. Thompson, Des Moines, Iowa

Original application December 16, 1938, Serial No. 246,241. Divided and this application October 1, 1940, Serial No. 359,284

6 Claims. (Cl. 192—32).

This invention relates to apparatus for transmitting torque, found especially useful in its application to variable speed gearing, and more particularly to transmission gearing for motor vehicles. The application is a division of my prior application Serial No. 246,241, filed December 16, 1938, which is in turn a continuation of my prior application Serial No. 2,047, filed January 16, 1935.

In my prior applications I have described and claimed a transmission gearing for motor vehicles in which the selection of certain speed ratios is automatically effected in response to variation in operating conditions, for example the speed of the driven shaft, but in which provision is made for the control of the initiation of such automatic selection, so that the speed ratio may be changed only at the will of the operator. The arrangement is such that increasing speed ratios are progressively selected without interrupting the drive; the transmission may be applied to conventional types of change speed gear trains without serious complication of the structure and function thereof, and at relatively low cost.

The present application deals with a coupling device which is described in the prior applications and forms part of the transmission mechanism disclosed therein, and in order that one use of this coupling device may be fully understood, it is again described herein in conjunction with other elements of the aforesaid transmission mechanism. It will be appreciated, however, that the coupling device has other uses, and that the speed change gearing is described merely to facilitate an understanding of the invention and its utility.

Thus it is an object of the invention claimed herein to provide a novel clutch means for selectively coupling two coaxially journaled members for rotation in such manner that the torque transmitted through the members may be utilized to effect the coupling.

A further object of the invention is the provision of a coupling device of the type described which is so constructed as to respond readily and automatically to operating conditions, such as variation in speed of one of the coupled elements, for establishing the coupling therebetween.

Further objects and features of the invention will be apparent from the following description taken in connection with the accompanying drawings, in which:

Figure 1 is a vertical longitudinal sectional view of change speed gearing embodying the principles of the invention;

Figure 2 is a plan view, partly in section, of the structure shown in Figure 1;

Figure 3 is a transverse sectional view taken substantially on the line 3—3 of Figure 1;

Figure 4 is a transverse sectional view taken substantially on the line 4—4 of Figure 1;

Figure 5 is a transverse sectional view taken substantially on the line 5—5 of Figure 1;

Figure 6 is a fragmentary sectional view on the line 6—6 of Figure 4;

Figure 7 is a detailed view of certain elements shown in Figure 2;

Figure 8 is an enlarged fragmentary sectional view of certain elements shown in Figure 1; and Figure 9 is a side elevation of the detail shown in Figure 8.

In order to facilitate an understanding of the invention, reference is made to the preferred embodiment thereof shown in the accompanying drawings and specific language is employed to describe the same. It will nevertheless be appreciated that no limitation of the scope of the invention is thereby intended, various modifications of the structure disclosed being contemplated such as would fall within the province of one skilled in the art to construct.

Figures 1 and 2 illustrate a selective change speed gearing adapted for use in motor vehicles, the gearing being enclosed and supported in a housing 10 having a detachable cover plate 11. A separate compartment 13, preferably formed integrally with the housing 10, encloses a control device for the speed ratio selecting mechanism, this control device being described in more detail hereinafter.

Journaled in the forward end of the housing 10 is a drive shaft 14 having a gear 15 on the rear end thereof. A driven shaft 24 is journaled in the rear end of the shaft 14 and extends lengthwise of the housing 10, being journaled in the rear end of the latter and being coupled to a propeller shaft 12 by means of a universal joint 59. The propeller shaft 12 may be connected through differential gearing, not shown, to the driving wheels of the vehicle in accordance with conventional practice.

A countershaft 16 is also journaled in the housing 10, this countershaft having formed thereon or secured thereto a spur gear 18, a smaller spur gear 19, and a still smaller spur gear 20. The gear 18 meshes with the gear 15 on the drive shaft 14, and the gears 20 and 19 are in mesh respectively with gears 35 and 47 which are mounted for free rotation on the driven shaft 24.

A stub shaft 21 supports gears 22 and 23, the latter being rigidly connected. The gear 22 meshes with the gear 20 on the countershaft 16 and the gear 23 meshes with the freely rotatable gear 40 on the driven shaft 24. Clutch means, associated with each of the gears 15, 35, 40, and 47, are selectively operable to couple any one of these gears to the driven shaft 24.

The structure thus far described is a well-known type of change speed gearing, falling within the class of gearing sometimes referred to as "slidable key, change speed gearing," and the mode of operation will be obvious to one familiar with conventional practice. Thus it will be apparent that the gears 35, 40, and 47 on the driven shaft 24 are continuously rotated from the countershaft 16, which is in turn continuously rotated by the driving shaft 14. If the gear 35 be coupled to the driven shaft 24, torque will be transmitted at the lowest speed ratio which can be established. If the gear 47 is coupled to the driven shaft 24, the latter will be rotated at a somewhat higher, or intermediate, speed ratio. The coupling of the gear 15 to the shaft 24 for concurrent rotation establishes a direct connection between the shafts 14 and 24, which is the highest speed ratio afforded by the gearing. Coupling the gear 40 to the driven shaft 24 will effect rotation of the latter in a direction reverse to that of the drive shaft 14.

The details of the structure thus far described form no part of the instant invention, and it will be apparent from the following description that the invention is applicable to many other types of transmission gearing. The invention is directed more particularly to improvements in the structure of the coupling devices.

It is preferable to associate the same type of coupling device with each of the several gears which are coaxial with the driven shaft 24, and for convenience similar reference characters will be employed to describe those elements of these several coupling devices which are similar in structure and function. The coupling devices, indicated generally at A, B, C, and D are selectively operable to connect the shaft 24 for rotation with the gears 15, 35, 40, and 47 respectively.

In each instance the coupling is preferably completed by positive engagement of a slidable key or toothed clutch element 27, rotating with the shaft 24, with a cooperating clutch element 28 formed on the associated gear. Thus referring to the coupling device A, it will be observed that the clutch element 27, having external radial clutch teeth thereon, is provided with a helical splined connection 26 with the shaft 24. The gear 15 is provided with a complementary internally toothed clutch element 28 within which the clutch element 27 may be slidably engaged. The details of the splined connection between the clutch element 27 and the shaft 24 form no part of the instant invention; preferably the splines are formed on a sleeve which is secured to the shaft, but any equivalent type of connection, constituting in effect an axial cam, will serve the desired purpose. Thus it is essential only that the clutch element 27 be so connected to the shaft 24 that the transmission of torque from one to the other tends to effect relative axial displacement thereof. Hence if the clutch element 27 associated with the coupling device A be rotated in a clockwise direction with respect to the shaft 24, as viewed from the forward end of the latter, forward axial movement of this clutch element on the shaft will result, and meshing engagement will be effected with the teeth of the complementary clutch element 28 to lock the gear 15 to the shaft 24.

It will be observed that in the coupling devices B, C, and D, the clutch elements 27 thereof are connected to the shaft 24 through cam means or helical splines similar to those hereinbefore described but of opposite hand. However, the clutch elements 26 of the coupling devices B and D are associated with complementary clutch elements 28 which are disposed at the rear side rather than at the forward side thereof, and these clutch elements will therefore function in the manner just described, on the application of torque thereto in a clockwise direction, to couple the gears 35 and 47 to the shaft 24. The clutch element 27 associated with the coupling device C will move into meshing relation with its complementary clutch element 28 upon the application of torque to the clutch element 27 in a counterclockwise direction.

From the structure thus far described it will be apparent that any one of the gears 15, 35, 40, and 47 may be positively clutched to the shaft 24 by any means which tends to establish synchronous rotation of any one of these gears and its associated clutch element 27, provided the shaft 24 is stationary or is rotating at a less speed than that of the gear in question. In other words, in order to clutch the gear to the shaft, means constituting in itself a clutch, acting between the gear and associated clutch element 27, may be employed.

Thus referring more particularly to Figures 3, 8, and 9, illustrating the structure associated with the coupling device A, it will be noted that an annular member 29 is secured to a radial flange formed integrally with the toothed clutch element 28, which is in turn integral with the gear 15 and the shaft 14. A plurality of pawls 30 are pivotally supported on the member 29 for rocking movement about axes extending longitudinally of the transmission, these pawls being positioned for engagement with the external toothed portion of the associated clutch element 27. Each of the pawls 30 is provided with a tail portion 31 having one side thereof beveled, as shown in Figure 8. An annular collar 32 surrounds the member 29, and this collar is displaceable axially by means of a fork 94 which partially embraces the collar so that the collar 32 may be slid axially and toward the right from the position in which it is shown in Figure 8 to a position in which it engages and embraces the tail portions 31 of the pawls 30. It will be appreciated that as the collar rides over the beveled edge of the tail portions 31 of the pawls, such tail portions will be depressed and the nose portions of the pawls will be moved outwardly, to disengage the pawls from the external teeth of the clutch element 27, and the pawls will be so retained until the collar 32 is again moved to the left to release the pawls. Each of the pawls is normally urged into engagement with the clutch element 27 by means of a spring 42, but the nose of each pawl is so formed that when the annular member 29 rotates in a clockwise direction with respect to the clutch element 27, the pawls will ride over the toothed portion of the clutch element with which they cooperate.

The function of the several coupling devices will now be readily understood. Thus, referring to the coupling device A, if the fork 94 be moved to the left from the position in which it is shown in Figure 1 to the position of Figure 8, the collar 32 will be correspondingly displaced and the pawls 30 will be released to permit engagement thereof with the external toothed portion of the clutch element 27. If the shaft 14 is rotating in a clockwise direction at a greater speed than the shaft 24, as is normally the case immediately prior to the selection of a higher speed ratio, the clutch element 27 will then be rotated by the pawls 30 in a clockwise direction with respect to the shaft 24, and by reason of the helical splined connection therebetween, the clutch element 27 will be displaced axially to the left from the position in which it is shown in Figure 8 and will engage the complementary clutch element 28 to lock the gear 15 and shaft 14 to the shaft 24 for concurrent rotation.

The structure and function of the remaining coupling devices may be precisely the same. Thus, immediately prior to the selection of the low speed ratio by actuation of the coupling device B, the shaft 24 is ordinarily stationary and the shaft 14 is rotating in a clockwise direction. Consequently when the pawls 30 of the coupling device are released by the collar 32 and engage with the external teeth of the clutch element 27, the latter will be shifted to the right to engage the complementary clutch element 28 carried by the gear 35, and the low speed ratio between the shafts 14 and 24 is thereby established. Similarly, immediately prior to the selection of the intermediate speed ratio, the shaft 24 is being driven from the countershaft through the gears 20 and 35, and is therefore rotating at a speed less than that of the gear 47, which is being driven from the gear 19 on the countershaft. Consequently, when the pawls 30 of the coupling device D are engaged with the associated clutch element 27 by displacement of the collar 32 to the right, the helical splined connection between the clutch element 27 and the shaft 24 will act to displace the clutch element 27 to the right into engagement with the complementary clutch element 28, whereby the gear 47 will be positively clutched to the shaft 24 to establish the intermediate speed ratio.

At this state in the progressive selection of ratios, the rotational speed of the shaft 24 exceeds the rotational speed of the gear 35. Consequently the pawls 30 of the coupling device B, associated with the gear 35, will ride over the external teeth of the associated clutch element 28. The cooperating toothed elements of the coupling device B are now disengaged by suitable means provided for the purpose. For example, one or more coil tension springs 100 may be connected between the clutch elements 27 associated with the coupling devices A and B, and between the clutch elements 27 associated with the coupling devices C and D, these springs acting to withdraw each of the clutch elements 27 when the direction of torque between the associated gear and the shaft 24 is reversed by the selection of a higher ratio.

The coupling device A functions similarly, after the selection of the intermediate speed ratio, to effect direct coupling of the shafts 14 and 24. Thus immediately prior to such selection, the shaft 24 is rotating at a lower speed than the shaft 14, and when the pawls 30 associated with the coupling device A are engaged with the clutch element 27 of that device, the latter is displaced to the left to effect the desired direct coupling, the pawls 30 associated with the coupling device D ride over the associated clutch element 27, and the latter is withdrawn from the complementary clutch element 28 by the action of the spring 100.

Immediately prior to the selection of the coupling device C, which effects reversal of the direction of rotation of the shaft 24, the latter is ordinarily stationary while the gear 40 is rotating in a counterclockwise direction. Consequently when the pawls 30 of the coupling device C are engaged with the associated clutch element 27, the latter is displaced to the left from the position in which it is shown in Figure 1, to positively connect the gear 40 to the shaft 24 and to rotate the latter in the reverse direction.

If, when any one of the coupling devices A, B, and D has been rendered operative to couple the associated gear to the shaft 24, the motor is decelerated so that the gear in question tends to rotate at a less speed than the shaft 24, the coupling device which is effected at the moment will be released, by disengagement of the cooperating clutch elements 27 and 28 in the manner hereinbefore explained, and the vehicle driving wheels will therefore be disconnected from the motor. In other words, the effect will be the same as that produced by the use of a one-way clutch in the driving train, and will be that sometimes described as "free wheeling." If the motor is again accelerated, any one of the coupling devices A, B or D which has previously been set to engage its associated gear with the shaft 24, by displacement of the associated collar 32 to permit the associated pawls 30 to act, will thereupon become again effective to couple that particular gear to the shaft 24.

It will be apparent that in lieu of the positive engagement afforded by the cooperation of the pawls 30 with the associated clutch elements 27, friction pawls engaging a continuous annular friction surface may be used, or some other friction type of coupling may be employed between the gear and the associated clutch element 27. Similarly, it is obvious that the positive toothed engagement between the several clutch elements 27 and the complementary clutch elements 28 is not essential. Thus the complementary teeth on these elements may be replaced by cooperating friction surfaces, which will be urged into clutching engagement by the action of the helical splines acting between the clutch element 27 and the shaft 24. Again, it is not essential that the coupling devices A, B, C, and D be similar in structure and function, it being possible to replace any one or more of these coupling devices with a different type of coupling means. This is of course particularly true of the coupling device C, which is operable in order to reverse the direction of rotation of the driven shaft and which therefore functions entirely independently of the remaining devices. However, the type of coupling device illustrated herein is particularly desirable since it permits the progressive selection of speeds without interruption of the drive, and thereby eliminates the necessity of operating the main vehicle clutch when selection is effected.

As hereinbefore pointed out, it is a feature of the invention to provide selecting mechanism which is only partially automatic in operation, and the desired result may be achieved by the use of control devices of the type disclosed more particularly in Figures 4 to 7 inclusive of the drawings.

Supported within the housing 10 for limited axial reciprocation is a shift rod 52, to which are secured the shift forks 95 and 96. Thus displacement of the shift rod forwardly from the central or neutral position which it occupies in Figure 1 effects withdrawal of the collar 32 of the coupling device C from the associated pawls, whereby the gear 40 may be coupled to the shaft 24 in the manner hereinbefore described, to rotate the shaft in the reverse direction. Displacement of the rod 52 rearwardly frees the pawls 30 of the coupling device B, so that the gear 35 may be automatically coupled to the shaft 42, providing that gear is rotating faster than the shaft 24. Secured to the shift rod 52 is a bracket 55 which extends through a slot 56 in the cover plate. A Bowden wire is connected between the outer end of the bracket 55 and an operating handle on the dash, or other part of the vehicle interior, so as to be readily accessible to the driver, whereby the gearing may be placed either in reverse or in low speed ratio in the manner hereinbefore explained and at the will of the operator.

A rod 74 is rotatably mounted in the housing 10 and extends longitudinally thereof and into the compartment 13, a pinion 75 being secured to the rod 74 adjacent the rear end of the latter. A rack 76 is disposed in meshing relation with the pinion 75, being retained in engagement therewith by a roller 77. At its lower end the rack 76 is pivotally connected to a bell crank lever 71, and the opposite arm of this lever carries a pin 72 engaging with a collar 73 formed on a sleeve 68. The sleeve 68 is provided with a further collar 69. Secured to one end of the shaft 61 is a hub 63 which supports a pair of outwardly directed arms 64. Lever arms 65 are pivoted on the arms 64, each lever arm 65 supporting at one end an inertia member or weight 66, the arrangement being such that these weights tend to move radially outward of the shaft 61, as the latter is rotated, under the action of centrifugal force, such movement being resisted by coiled tension springs 67 connecting each weight with the fulcrum of the opposite lever arm 65. Each of the lever arms 65 is provided, on the other side of the fulcrum therefor, with a finger 79 which engages with the collar 69. The shaft 61 is rotated from the shaft 24 by means of worm gearing 60, 62.

The structure just described constitutes a governor mechanism for rotating the shaft 74 through an angle which is determined by the speed of rotation of the driven shaft 24 of the transmission, and the mode of operation of this structure will be at once apparent. Details of the governor mechanism form no essential part of the present invention and may be modified as desired.

The fork 94 is carried by a boss 92 which is in turn mounted on the shaft 74 and is freely reciprocable thereon. Immediately adjacent the boss 92 and secured to the shaft 74, are collars 90 and 91, the latter being shaped to form an axial closed cam, the collar 90 being shaped to follow the cam surfaces thus afforded. It will be observed from Figure 7 of the drawings that as the shaft 74 is rotated, the collar 90 and fork 94 are reciprocated, the fork being thereby movable to either of two positions. These two positions of the fork correspond to the two positions of the collar 32 engaged by the fork, in one of which the collar disengages the pawls 30 from the clutch element 27, and in the other of which the pawls are released to permit engagement therewith of the teeth of the clutch element.

The shaft 74 also affords a support for a boss 93 which carries the fork 97, and this boss cooperates with collars 98 and 99 which are secured to the shaft 74 and which are formed to afford a closed axial cam, the construction being identical with that illustrated in Figure 7. However, the cam surfaces on the collars 98 and 98' are displaced about the axis of the shaft 74 with respect to the collars 90 and 91, the arrangement being such that when the shaft is rotated in a counterclockwise direction, as viewed in Figure 6, the fork 97 will first be displaced toward the rear, whereby the coupling device D is rendered effective, and the fork 94 will thereafter be displaced forwardly, to render the coupling device A effective.

The sequence of operations performed by the structure thus far described in bringing the vehicle from a standstill to direct drive or high speed ratio may be briefly described as follows. After the motor has been started, the Bowden wire 57 is first manually operated to release the pawls 30 associated with the coupling device B and thereby to connect the low speed gear 35 to the driven shaft 24. When a certain predetermined vehicle speed is reached, the governor mechanism shown in Figure 5 has rotated the shaft 74 to an extent sufficient to release the pawls 30 associated with the coupling device D, thereby to connect the intermediate speed gear 47 to the driven shaft 24, and the low speed gear 35 is automatically disconnected from shaft 24 as hereinbefore explained. As the vehicle speed further increases, the shaft 74 is rotated further, the pawls 30 associated with the coupling device A are released, and the gear 15 and shaft 14 are directly connected to the shaft 24, thus establishing the highest ratio or direct drive. If the load on the vehicle increases while the gearing is in direct drive, for example on ascending a steep grade, with the result that the vehicle speed is materially reduced, the governor mechanism will rotate the shaft 74 in the reverse direction, and the pawls 30 associated with the coupling device A will be withdrawn from the associated clutch element 27. If the operator then reduces the motor speed by closing the motor throttle, so that the shaft 14 tends to rotate slower than the shaft 24, the clutch element 27 associated with the coupling device A will be withdrawn from the clutch element 28 by the combined action of the helical splines on the shaft 24 and the spring 100. Opening of the throttle thereafter will serve to rotate the gear 47 faster than the shaft 24, and this gear will be coupled to the shaft as hereinbefore explained to re-establish the intermediate speed ratio. This action is predicated on the assumption that the vehicle speed has not been reduced to such an extent that the collar 32 associated with the pawls 30 of the coupling device D has disengaged these pawls from the cooperating clutch element 27; if the vehicle speed is quite low, the low speed coupling device B will be operated on opening of the throttle, as hereinbefore explained.

The speed ratio selection is preferably made further dependent on the will of the operator by the provision of additional means responsive to engine operation for controlling the rotation of the shaft 74, by means of which the coupling devices A and D are actuated. Thus a disc 78 is secured to the shaft 74, the periphery of the disc being recessed as indicated at 79 and 80. A pawl 84 pivoted on a bracket 85 is normally urged into engagement with the periphery of the disc 78 by a spring 87. Formed integrally with the pawl is an arm 86 extending laterally of the compartment 13. A longitudinally extending rod 88, slidably supported within the housing 10, lies directly over the arm 86 and is provided adjacent the latter with a one-way pawl 89, the arrangement being such that when the rod 88 is moved to the left from the position in which it is shown in Figure 6, the pawl 89 will force the rod downwardly. On reciprocation of the rod 88 in the opposite direction, the pawl 89 will ride over the rod without depressing the same, assuming the position shown in dotted lines in Figure 6, and will again drop into the full-line position to the rear of the arm 86. The forward end of the rod 88 is connected to the motor throttle, or to some actuating means therefor such as the usual accelerator pedal, so that on each movement of the throttle from closed to open position, the rod 88 will be displaced forwardly and the arm 86 depressed.

When the shaft 74 is rotated by the governor mechanism to a position in which the pawls 30 associated with the coupling device D are released, the nose of the pawl 84 will drop into the recess 79, to lock the shaft 74 against further rotation. Thus the intermediate speed ratio will be maintained until the operator desires to establish direct drive, which he may do, provided the requisite vehicle speed has been reached, by releasing the accelerator pedal and again depressing it, thus causing the rod 88 to depress the arm 86, disengage the pawl from the recess 79, and permit the disc 78 and shaft 74 to rotate to a position in which the nose of the pawl will engage the recess 80. When this point is reached, the pawls 30 associated with the coupling device A are released, and direct drive is established.

As hereinbefore explained, if the vehicle speed is reduced after direct drive has been established, and the operator finds it desirable to establish a lower speed ratio, he decelerates and then accelerates the motor. When the accelerator pedal is thus released and again depressed while the vehicle is ascending a grade at relatively slow speed, the pawl 84 will be released from the recess 80, and the governor mechanism effects rotation of the shaft 74 in a reverse direction until the pawl 84 falls in the recess 79, at which instant the intermediate speed ratio is established, the high speed ratio being discontinued when the motor is retarded, as hereinbefore explained. In order to re-establish the low speed ratio, the operator must again release and depress the accelerator pedal to permit the disc 78 to rotate to the position in which it is shown in Figure 4 of the drawings. It will thus be seen that the selection of the several speed ratios, while progressing automatically in either direction in response to variation in vehicle speed, is at the same time largely under the control of the operator since such changes are initiated in response to motor operation.

Formed integrally with the bracket 55 is a laterally extending arm 82, the free end of the latter being arranged to overlie the lug 83 on the disc 78 when the vehicle is not running and the shift rod 52 occupies either the neutral or the reverse position. Thus the selection of intermediate or high speed ratios while the gearing is in reverse, or prior to the selection of the low speed ratio, is definitely prevented.

An upstanding arm 99 is formed integrally with the arm 82, the arm 99 being formed at its upper end with a hook-shaped or cam portion 102, as shown more particularly in Figure 6, for engagement with the arm 86. Thus when the shift rod 52 is displaced to a neutral position, intermediate the positions in which the coupling devices B and C respectively are rendered operative, the arm 86 will be engaged and depressed by the hook-shaped portion 102, to release the pawl 84 from either of the recesses 79 or 80 in which it may be disposed. Thus the disc 78 and the shaft 74 may be released for rotation by manual actuation of the Bowden wire 57. The hook-shaped portion 102 is sufficiently long to permit of displacement of the shift rod 52 to a position in which the coupling device C is rendered operative to place the gearing in reverse.

While a speed controlled governor is employed for effecting selection of the several speed ratios, it is obvious that the selection of speed may be effected in response to variation of other characteristics of vehicle operation, such as the transmitted torque, or the combined speed-torque characteristics. The utilization of such characteristics for selecting speed ratios has been heretofore proposed. Similarly, it is apparent that the manual connection of the selecting mechanism to the accelerator pedal is only one way of controlling the initiation of speed selection, it being feasible to employ other means for rendering the selecting mechanism dependent upon motor operation.

The term "axial cam means" as employed herein is intended to designate means having co-acting surfaces of which one is inclined axially of the shaft, whereby on the occurrence of relative rotation between said surfaces, the parts with which the surfaces are associated are displaced axially of the shaft.

Having thus described the invention, what is claimed as new and desired to be secured by Letters Patent is:

1. In mechanism for coupling a rotatable shaft and a coaxial element for concurrent rotation, the combination with a member supported for axial reciprocation and coaxial rotation with respect to said shaft and element, axial cam means connecting said member and shaft, said member and element having coacting clutch means engageable on axial displacement of said member, and means operable to relatively rotate said member and shaft to effect such axial displacement of said member by said cam means, said last named means including a releasable connection between said element and said member, and speed responsive means driven by said shaft for operating said releasable connection.

2. In apparatus for transmitting torque, the combination with a rotatable driven shaft, of a driving gear supported for rotation on said shaft, means for operatively coupling said gear and shaft, said means including a member supported on said shaft for rotation and axial reciprocation with respect thereto, axial cam means acting between said member and shaft for effecting relative axial displacement thereof on the occurrence of relative rotation therebetween, cooperating clutch means associated with said gear and member engageable by axial displacement of said member in one direction, and means operable to rotate said member in the direction of the desired rotation of said shaft only, and at a higher speed than said shaft, to engage said clutch means, said last named means including a device carried by said gear for engaging said member, and speed responsive means for rendering said device operative.

3. In apparatus for transmitting torque, the combination with a rotatable driven shaft, of a driving gear supported for rotation on said shaft, means for operatively coupling said gear and shaft, said means including a member supported on said shaft for rotation and axial reciprocation with respect thereto, axial cam means acting between said member and shaft for effecting relative axial displacement thereof on the occurrence of relative rotation therebetween, cooperating clutch means associated with said gear and member engageable by axial displacement of said member in one direction, and means operable to rotate said member in the direction of the desired rotation of said shaft only, and at a higher speed than said shaft, to engage said clutch means, said last named means including a clutch device acting between said gear and said member, and speed responsive means driven by said shaft for operating said clutch device.

4. In apparatus for transmitting torque, the combination with a rotatable driven shaft, of a driving gear supported for rotation on said shaft, means for operatively coupling said gear and shaft, said means including a member supported on said shaft for rotation and axial reciprocation with respect thereto, axial cam means acting between said member and shaft for effecting relative axial displacement thereof on the occurrence of relative rotation therebetween, cooperating clutch means associated with said gear and member engageable by axial displacement of said member in one direction, means operable to rotate said member in the direction of the desired rotation of said shaft only, and at a higher speed than said shaft, to engage said clutch means, said last named means including a releasable pawl and ratchet device acting between said gear and said member, and axially displaceable operating means associated with said pawl and ratchet device to effect the release and application of the latter.

5. In apparatus for transmitting torque, the combination with a rotatable driven shaft, of a driving gear supported for rotation on said shaft, means for operatively coupling said gear and shaft, said means including a member supported on said shaft for rotation and axial reciprocation with respect thereto, axial cam means acting between said member and shaft for effecting relative axial displacement thereof on the occurrence of relative rotation therebetween, cooperating clutch means associated with said gear and member engageable by axial displacement of said member in one direction, means operable to rotate said member in the direction of the desired rotation of said shaft only, and at a higher speed than said shaft, to engage said clutch means, whereby overrunning of said gear by said shaft effects displacement of said member in the opposite direction to disengage said clutch means, said last named means including a releasable pawl and ratchet device acting between said gear and said member, axially displaceable operating means associated with said pawl and ratchet device to effect the release and application of the latter, and speed responsive means driven by said shaft for axially displacing said operating means.

6. In apparatus for transmitting torque, the combination with a rotatable driven shaft, of a driving gear supported for rotation on said shaft, means for operatively coupling said gear and shaft, said means including a member supported on said shaft for rotation and axial reciprocation with respect thereto, axial cam means acting between said member and shaft for effecting relative axial displacement thereof on the occurrence of relative rotation therebetween, cooperating clutch means associated with said gear and member engageable by axial displacement of said member in one direction, means operable to rotate said member in the direction of the desired rotation of said shaft only, and at a higher speed than said shaft, to engage said clutch means, said last named means including a releasable pawl and ratchet device acting between said gear and said member, and operating means associated with said pawl and ratchet device to effect the release and application of the latter.

THEODORE F. THOMPSON.